US011861902B2

United States Patent
Clark et al.

(10) Patent No.: US 11,861,902 B2
(45) Date of Patent: Jan. 2, 2024

(54) OBJECT DETECTIONS FOR VIRTUAL REALITY

(71) Applicant: HEWLETT-PACKARD DEVELOPMENT COMPANY, L.P., Spring, TX (US)

(72) Inventors: Alexander Wayne Clark, Spring, TX (US); Brandon James Lee Haist, Spring, TX (US); Henry Wang, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/592,728

(22) Filed: Feb. 4, 2022

(65) Prior Publication Data
US 2022/0157055 A1 May 19, 2022

Related U.S. Application Data

(63) Continuation of application No. 16/076,994, filed as application No. PCT/US2017/028749 on Apr. 21, 2017, now Pat. No. 11,270,113.

(51) Int. Cl.
*G06V 20/20* (2022.01)
*G06T 7/70* (2017.01)
*G02B 27/01* (2006.01)
*G06T 7/20* (2017.01)

(52) U.S. Cl.
CPC ........... *G06V 20/20* (2022.01); *G02B 27/017* (2013.01); *G06T 7/20* (2013.01); *G06T 7/70* (2017.01)

(58) Field of Classification Search
CPC ......... G06K 9/00671; G06T 7/70; G06T 7/20; G02B 27/017
See application file for complete search history.

(56) References Cited

U.S. PATENT DOCUMENTS

| 5,900,849 | A   | 5/1999  | Gallery |
| 6,611,622 | B1  | 8/2003  | Krumm |
| 9,341,849 | B2  | 5/2016  | Wong et al. |
| 9,972,187 | B1* | 5/2018  | Srinivasan ........... G08B 21/043 |
| 10,380,875 | B1 | 8/2019  | Roberts et al. |
| 2003/0215134 | A1 | 11/2003 | Krumm |

(Continued)

FOREIGN PATENT DOCUMENTS

| CN | 103480154 A | 1/2014 |
| CN | 105705210 A | 6/2016 |

OTHER PUBLICATIONS

Metz, R., "How to Avoid Real Objects While in a Virtual World," Jun. 12, 2015, 9 p. [Online] https://www.technologyreview.com/s/538336/how-to-avoid-real-objects-while-in-a-virtual-world.

(Continued)

*Primary Examiner* — Qian Yang
(74) *Attorney, Agent, or Firm* — Quarles & Brady LLP

(57) ABSTRACT

An example virtual reality (VR) system includes a VR headset, a plurality of monitoring stations, and an image processing device. Each of the monitoring stations includes an image sensor to capture images of the VR headset and an environment in which the VR headset is used. The image processing device is to process the images captured by the monitoring stations to detect an object in the environment, and to transmit, to the VR headset, information that includes notification of the object detected.

20 Claims, 6 Drawing Sheets

(56) References Cited

U.S. PATENT DOCUMENTS

| | | | |
|---|---|---|---|
| 2013/0328928 A1 | 12/2013 | Yamagishi et al. | |
| 2014/0364212 A1 | 12/2014 | Osman et al. | |
| 2015/0094142 A1 | 4/2015 | Stafford | |
| 2015/0242683 A1* | 8/2015 | Tang | G06T 7/246 |
| | | | 382/173 |
| 2015/0279116 A1 | 10/2015 | Yachida | |
| 2016/0078641 A1 | 3/2016 | Aratani et al. | |
| 2016/0124502 A1 | 5/2016 | Sawyer et al. | |
| 2016/0232717 A1 | 8/2016 | Wong et al. | |
| 2017/0053440 A1 | 2/2017 | Yoon et al. | |
| 2017/0195640 A1* | 7/2017 | Pasternak | H04N 7/186 |
| 2018/0047212 A1 | 2/2018 | Long | |
| 2019/0070506 A1 | 3/2019 | Stafford | |

OTHER PUBLICATIONS

Hoffmeier, N., "Project Alloy: Intel's Next Step is a Big One for VR, AR, and Merged Realities," Aug. 25, 2016, [Online] https://virtualrealitypop.com/project-alloy-intels-next-step-is-a-big-one-for-vr-ar-and-merged-realities-e4181d666195# dtigwftor.

* cited by examiner

OBJECT DETECTIONS FOR VIRTUAL REALITY

CROSS-REFERENCE TO RELATED APPLICATIONS

The present application is a continuation of U.S. patent application Ser. No. 16/076,994, filed on Aug. 9, 2018 and titled "Object Detections for Virtual Reality," which is a national stage application, filed under 35 U.S.C. § 371, of International Patent Application No. PCT/US2017/028749, filed on Apr. 21, 2017, and titled "Object Detections for Virtual Reality," the contents of each of which are incorporated herein by reference in their entirety as a part of the present application.

BACKGROUND

Virtual reality (VR) is a form of computer generated environment (i.e., a virtual world) with which a user can interact in ways that may be similar to or different from the ways that the user interacts with the physical environment. A VR system produces video images that present the virtual world to the system user. A VR system may include various components, such as a headset to display the video images to the user and a controller to receive control input from the user.

BRIEF DESCRIPTION OF THE DRAWINGS

Various examples will be described below referring to the following figures.

DETAILED DESCRIPTION

Virtual reality (VR) systems allow a user to interact with an environment that is generally unavailable to the user in the physical world. One goal of VR systems is to provide the user with an experience that is a close analog to the user's experience and interaction with the physical world. To achieve a convincing experience, the VR system generally visually isolates the user from the physical environment by blocking the user's vision with respect to the physical environment. Some systems may further enhance experience of the virtual world by isolating the user's hearing to the virtual world. Thus, the user's experience in VR may be limited to only the video and audio signals generated by the VR system. While such visual and auditory isolation may enhance the user's experience in the virtual world, the user remains subject to forces present in the physical world.

Because the user of a VR system is sensorially isolated from the physical environment, the user may be vulnerable, or feel vulnerable, to conditions present in the physical environment. For example, objects that move in the physical environment proximate the VR system user will generally be invisible to the user and a collision between the object and the user may occur. Such objects may include other users of the VR system, human beings or animals generally, and other objects subject to change of proximity to the user caused by movement of the user or movement of the object.

The VR system disclosed herein monitors the physical environment in which a VR system user operates to identify objects with which the user may collide. The VR system includes a plurality of monitoring stations that capture video images of the physical environment. The monitoring stations may be disposed at the periphery of the VR system operational environment to capture images of the environment from different angles. The images captured by the monitoring stations may be provided to an image processing device, such as a computer, that identifies objects in the captured images that present potential collision hazards for the VR system user. On identification of an object that presents a potential collision hazard, the image processing device may transmit information to the VR headset of the user that informs the user of the presence of the identified object. For example, on receipt of the information from the image processing system, the VR headset may display a representation of the object at location relative the user that approximates the location of the object relative the user in the physical environment. Accordingly, the VR system disclosed herein may apprise the user of the VR system of the presence of an object in the physical environment and allow the user to avoid a collision with object.

Figure 1:
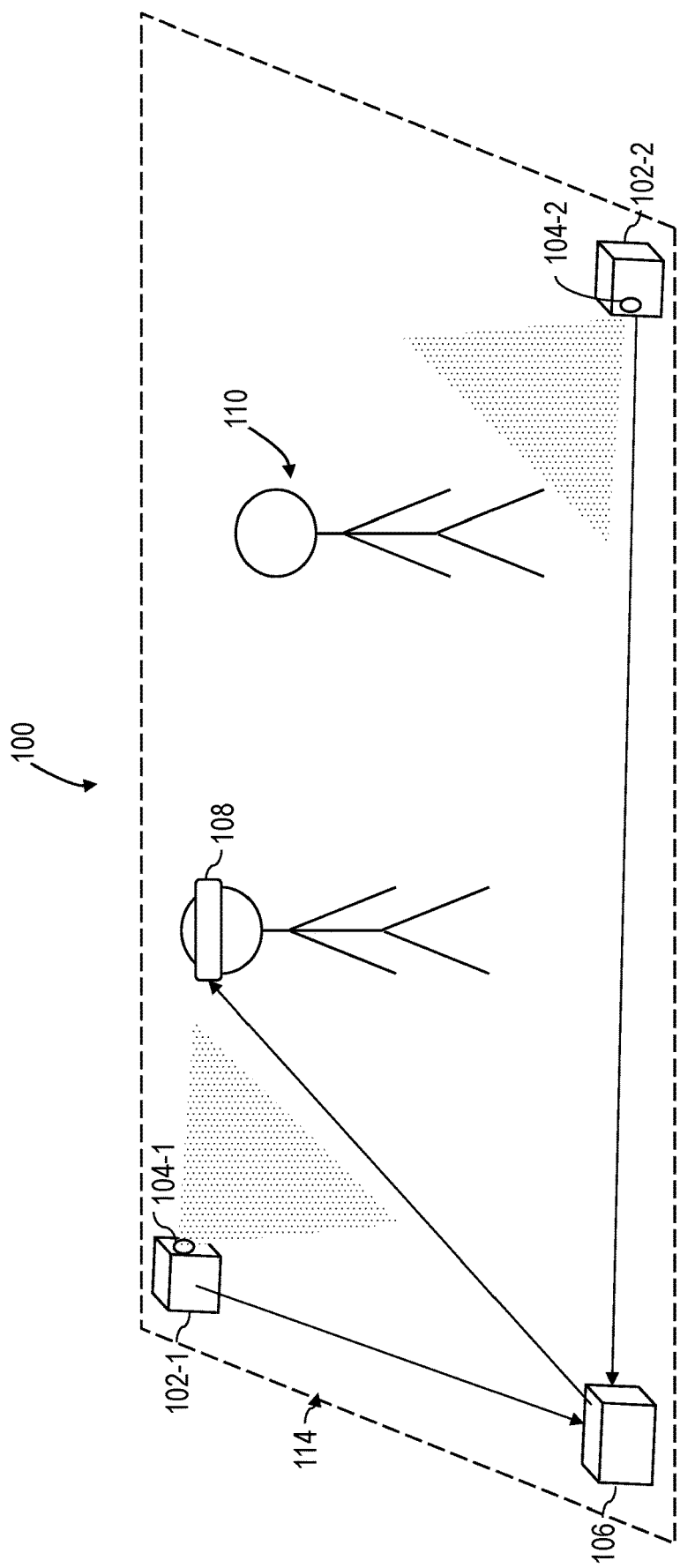
FIG. 1 shows a virtual reality (VR) system with object detection in accordance with various examples.

FIG. 1 shows a VR system 100 with object detection in accordance with various examples. The VR system 100 includes a monitoring stations 102-1 and 102-2 (collectively referred to as monitoring stations 102), a VR headset 108, and an image processing device 106. While two monitoring stations 102 are shown in the VR system 100, some examples of the VR system 100 may include more or less than two monitoring stations 102. Similarly, although FIG. 1 depicts the image processing device 106 as separate from the VR headset 108 and the monitoring stations 102, in some implementations of the VR system 100 the image processing device 106 may a component of or integrated with the VR headset 108 or one of the monitoring stations 102.

Each of the monitoring stations 102 includes a distinct image sensor. For example, monitoring station 102-1 may include an imaging sensor 104-1. Monitoring station 102-2 may include an imaging sensor 104-2. Imaging sensors 104-1 and 104-2 may be collectively referred to as imaging sensor 104. The image sensor 104 may be an infra-red (IR) depth sensing camera, a camera that captures luma and/or chroma information, or other image sensor suitable for capturing images of objects in a VR operating environment. In FIG. 1, monitoring stations 102 are disposed to capture images of the VR operating environment 114.

The VR operating environment 114 is the physical area in which a user of the VR system 100, i.e., a user of the VR headset 108, interacts with the virtual world presented to the user via the VR headset 108. For example, the VR headset 108 includes video display technology that displays images of the virtual world to the user of the VR headset 108. The monitoring stations 102 may be disposed at different locations in the VR operating environment 114 to capture images of the VR operating environment 114 from different angles.

The image processing device 106 is communicatively coupled to the monitoring stations 102. For example, the image processing device 106 may be communicatively coupled to the monitoring stations 102 via a wired or wireless communication link, such as a IEEE 802.11 wireless network, an IEEE 802.3 wired network, or any other wired or wireless communication technology that allows the images of the VR operating environment 114 captured by the monitoring stations 102 to be transferred from the monitoring stations 102 to the image processing device 106. The spatial relationship of the monitoring stations 102 may be known to the image processing device 106. For example, the relative angle(s) of the optical center lines of the image sensors 104 of the monitoring stations 102 may be known to the image processing device 106. That is, the monitoring stations 102 may be disposed to view the VR operating environment 114 at a predetermined relative angle, or the angle at which the monitoring stations 102 are disposed relative to one another may be communicated to the image processing device 106.

The image processing device 106 processes the images captured by the monitoring stations 102 to identify objects in the VR operating environment 114. The image processing device 106 may apply motion detection to detect objects in the VR operating environment 114 that may collide with the user of the VR headset 108. For example, the image processing device 106 may compare the time sequential images (e.g., video frames) of the VR operating environment 114 received from each monitoring station 102 to identify image to image changes that indicate movement of an object. In FIG. 1, a person 110 is moving in the VR operating environment 114. The person 110 is representative of any object that may be moving in the VR operating environment 114. The monitoring stations 102 capture images of the VR operating environment 114, and transmit the images to the image processing device 106. For each monitoring station 102, the image processing device 106 compares the images received from the monitoring station 102 and identifies differences in the images as motion of an object. For example, movement of the person 110 will cause differences in the images captured by the monitoring stations 102, and the image processing device 106 will identify the image to image difference as movement of the person 110.

When the image processing device 106 detects an object in the VR operating environment, the image processing device 106 communicates to the VR headset 108 information regarding the detected object. The image processing device 106 is communicatively connected to the VR headset 108. For example, the image processing device 106 may be communicatively coupled to the VR headset 108 via a wired or wireless communication link, such as a IEEE 802.11 wireless network, an IEEE 802.3 wired network, or any other wired or wireless communication technology that allows information to be transferred from the image processing device 106 to the VR headset 108.

The image processing device 106 may determine the location (in three-dimensional space) of an object detected as moving (and pixels representing points of the object) in the images captured by each of the monitoring stations 102 at a given time. Using the relative locations of the monitoring stations 102 known by the image processing device 106, the image processing device 106 can determine the location of the detected object (e.g., determine the location of a point of the object identified in images captured by different monitoring stations 102) by applying triangulation. That is, with the VR headset 108 having a first location, monitoring station 102-1 having a second location and first angle, and monitoring station 102-2 having a third location and second angle, image processing device 106 may determine a fourth location to be the location of a detected object in three-dimensional space based on the first location, the second location, the third location, the first angle, and the second angle by triangulating a common point found in multiple two-dimensional images captured by different monitoring stations 102 (e.g., monitoring station 102-1 and 102-2). The image processing device 106 may transmit location information for a detected object to the VR headset 108.

The image processing device 106 may also determine the identity of an object detected in the VR operating environment 114. For example, on detection of an object in the VR operating environment 114, the image processing device 106 may apply a Viola-Jones object detection framework to identify the object based on the features of the object captured in an image. The image processing device 106 may transmit identity information (e.g., person, animal, etc.) for a detected object to the VR headset 108.

The VR headset 108 displays the information provided by the image processing device 106 for communication to a user. If the image processing device 106 renders the video displayed by the VR headset 108, then the image processing device 106 may include the information identifying a detected object in the video frames transmitted to the VR headset 108. If the VR headset 108 itself produces the video data displayed by the VR headset 108, then the VR headset 108 may receive the information about the detected object from the image processing device 106 and integrate the information in the video generated by the VR headset 108. Having been made aware of the presence of detected object, and optionally the objects location and/or identity, by the information presented via the VR headset 108, the user will not be surprised by the presence of the detected object in the VR operating environment and can avoid collision with the detected object.

Figure 2:
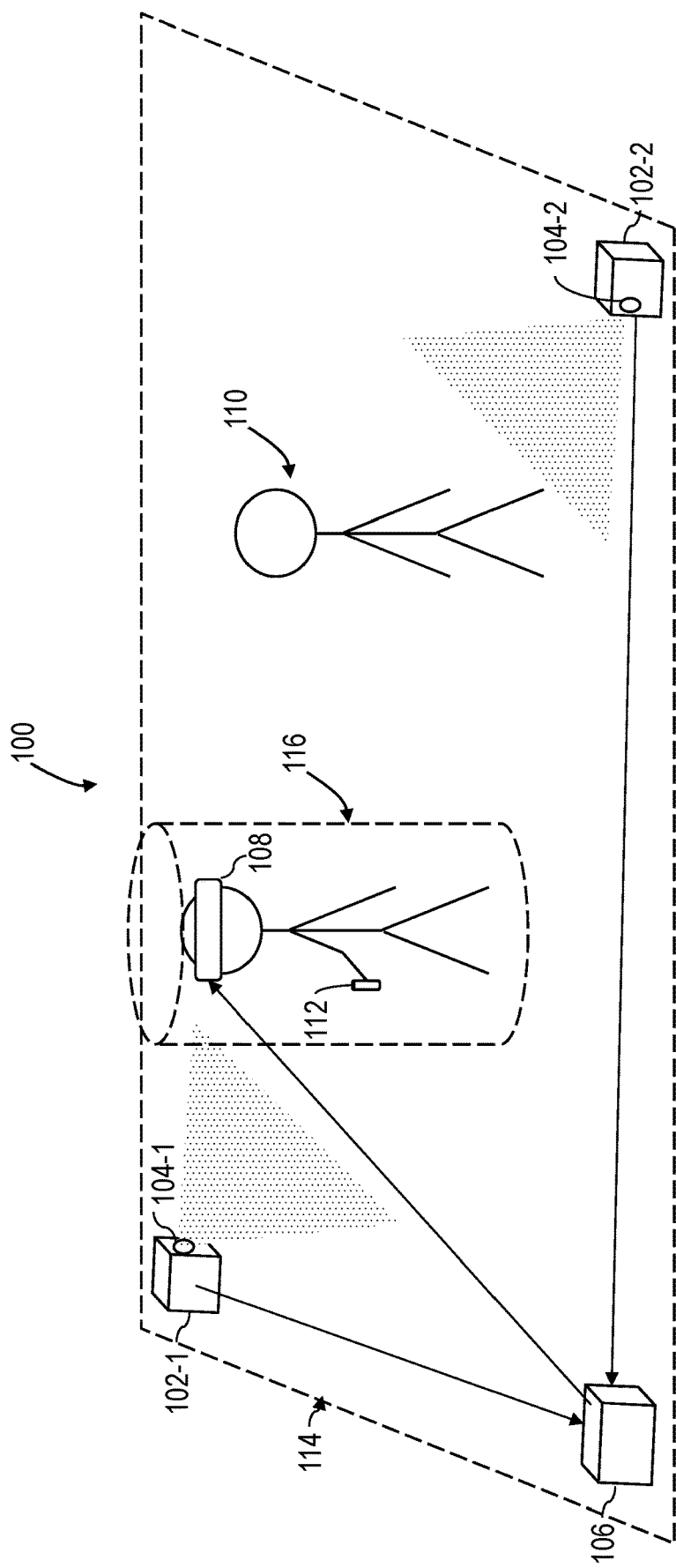
FIG. 2 shows another implementation of a virtual reality (VR) system with object detection in accordance with various examples.

FIG. 2 shows additional detail of the VR system 100 in accordance with various examples. The VR system 100 may also include one or more controllers 112. The controller 112 is an input device that the user of the VR headset 108 manipulates to interact with the virtual world. The controller 112 may be, for example, a handheld device that the user operates to digitally interact with virtual objects in the virtual world. To identify objects in the VR operating environment 114 that may interfere with the user of the VR headset 108, the image processing device 106 identifies an area about the VR headset 108 and the controller 112 as corresponding to the user. For example, the image processing device 106 may define an area 116 extending from above the VR headset 108 to the floor and to a maximum or predetermined extension of the controller 112 about a central axis corresponding to the user as representing the area occupied by the user of the VR system. The image processing device 106 may disregard motion detected within the area 116 when detecting objects in the VR operating environment 114. Thus, the image processing device 106 may detect motion outside the area 116 as corresponding to an object that may be of interest to the user of the VR system 100 while ignoring motion inside the area 116 with respect to object detection.

Some implementations of the image processing device 106 may dynamically map the body and limbs of a user of the VR headset 108 to define an area within which motion is disregarded. For example, the image processing device 106 may determine the location of the controller(s) 112 knowing that the distal end of the user's arm is attached to a controller 112. The VR headset 108 identifies the location of the user's body and the user's legs are connected to the body. Using this information, the image processing device 106 may determine a dynamic amorphous boundary that defines an area within which motion is disregarded.

Figure 3:
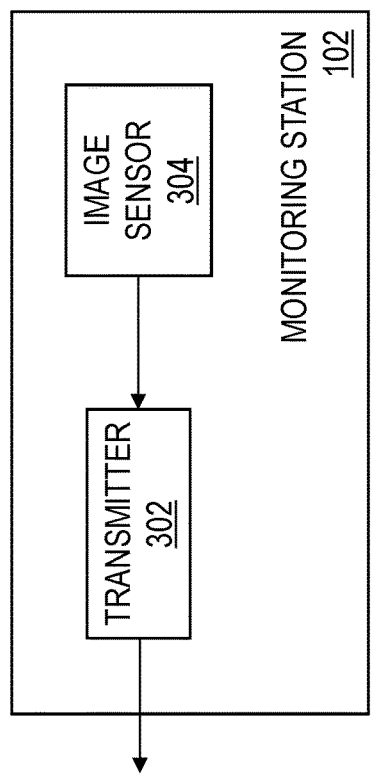
FIG. 3 shows a block diagram of a monitoring station for object detection in a VR system in accordance with various examples.

FIG. 3 shows a block diagram of a monitoring station 102 for object detection in a VR system in accordance with various examples. The monitoring station 102 includes an image sensor 304 and a transmitter 302. The image sensor 304 may be a red-green-blue light sensor of any resolution suitable for detection of movement in the VR operating environment 114. In some implementations of the monitoring station 102, the image sensor 304 may be an IR depth sensor that includes an IR projector and an IR camera. In the IR depth sensor, the IR projector may project a pattern of IR points and the IR camera may capture images of the points reflected from objects in the VR operating environment that can processed to determine distance.

The image sensor 304 is communicatively coupled to the transmitter 302. Images captured by image sensor 304 are transferred to the transmitter 302, which transmits the images to the image processing device 106. The transmitter 302 may include circuitry to transmit the images via wired or wireless media. The monitoring station 102 may include additional components that have been omitted from FIG. 3 in the interest of clarity. For example, the monitoring station 102 may include a processor coupled to the image sensor 304 and the transmitter 302, where the processor provides control and image transfer functionality in the monitoring station 102.

Figure 4:
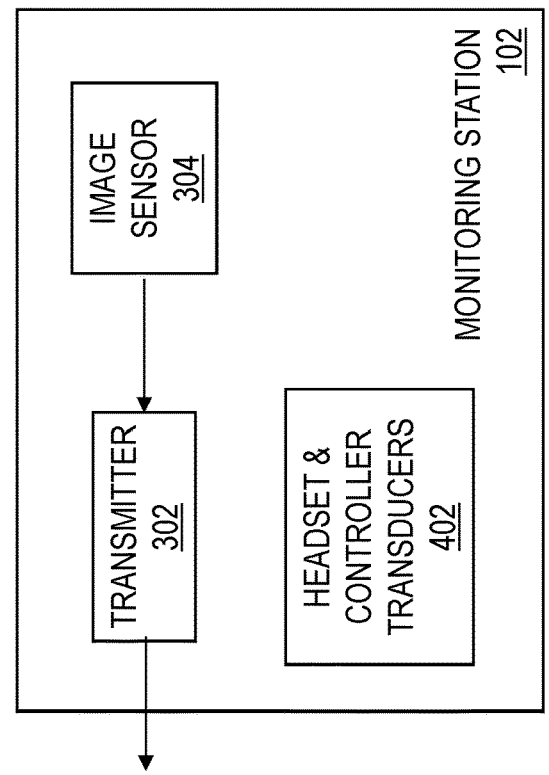
FIG. 4 shows a block diagram of another implementation of a monitoring station for object detection in a VR system in accordance with various examples.

FIG. 4 shows a block diagram of a monitoring station 102 for object detection in a VR system in accordance with various examples. The monitoring station 102 of FIG. 4 is similar to that shown in FIG. 3 and further includes headset and controller transducers 402. The headset and controller transducers 402 may generate optical timing signals that allow the location and orientation of the VR headset 108 and each VR controller 112 to be determined with sufficient specificity to facilitate accurate determination of the position of the VR headset 108 and the VR controller 112 in the VR operating environment 114. The headset and controller transducers 402 may include IR emitters that generate timed signals (e.g., a reference pulse and swept plane) for reception by sensors on the VR headset 108 and the VR controller 112. The location and orientation of the VR headset 108 and controller 112 can be determined based on which sensors of the VR headset 108 and controller 112 detect signals generated by the transducers 402 and relative timing of pulse and sweep detection.

Figure 5:
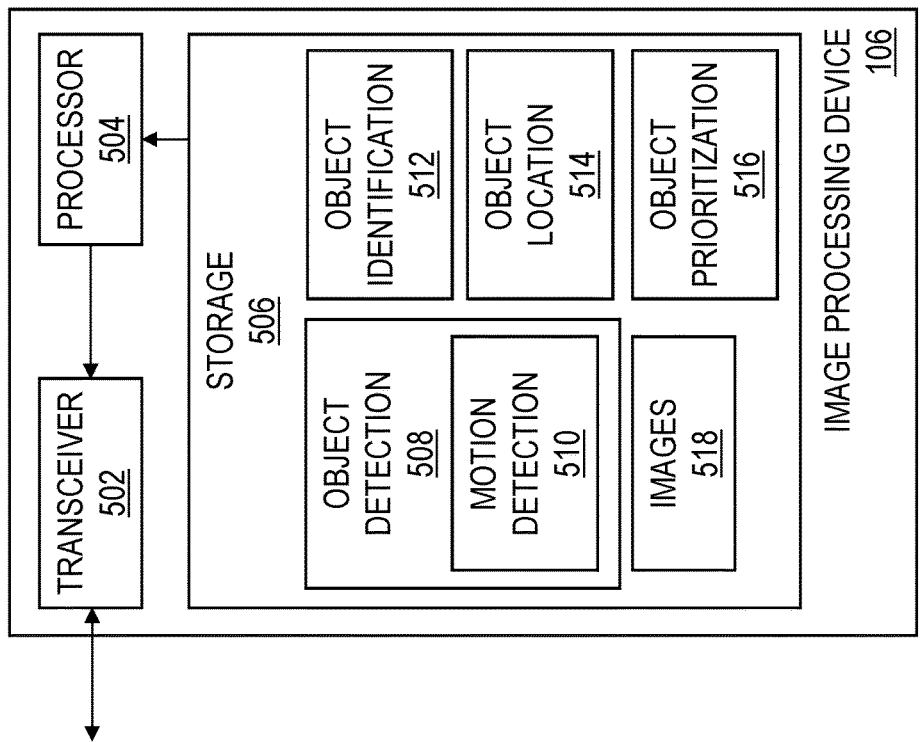
FIG. 5 shows a block diagram of an image processing device for object detection in a VR system in accordance with various examples.

FIG. 5 shows a block diagram of an image processing device 106 for object detection in a VR system in accordance with various examples. The image processing device 106 includes a transceiver 502, a processor 504, and storage 506. The image processing device 106 may also include various components and systems that have been omitted from FIG. 5 in the interest of clarity. For example, the image processing device 106 may include display systems, user interfaces, etc. The image processing device 106 may be implemented in a computer as known in the art. For example, the image processing device 106 may be implemented using a desktop computer, a notebook computer, rack-mounted computer, a tablet computer or any other computing device suitable for performing the image processing operations described herein for detection of objects in the VR operating environment 114.

The transceiver 502 communicatively couples the image processing device 106 to the monitoring stations 102 and the VR headset 108. For example, the transceiver 502 may include a network adapter that connects the image processing device 106 to a wireless or wired network that provides communication between the monitoring stations 102 and the image processing device 106. Such a network may be based on any of a variety of networking standards (e.g., IEEE 802) or be proprietary to communication between devices of the VR system 100.

The processor 504 is coupled to the transceiver 502. The processor 504 may include a general-purpose microprocessor, a digital signal processor, a microcontroller, a graphics processor, or other device capable of executing instructions retrieved from a computer-readable storage medium. Processor architectures generally include execution units (e.g., fixed point, floating point, integer, etc.), storage (e.g., registers, memory, etc.), instruction decoding, instruction and data fetching logic, peripherals (e.g., interrupt controllers, timers, direct memory access controllers, etc.), input/output systems (e.g., serial ports, parallel ports, etc.) and various other components and sub-systems.

The storage 506 is a computer-readable medium that stores instructions and data for access and use by the processor 504. The storage 506 may include any of volatile storage such as random access memory, non-volatile storage (e.g., a hard drive, an optical storage device (e.g., CD or DVD), FLASH storage, read-only-memory), or combinations thereof. The storage 506 includes object detection 508, object identification 512, object location 514, object prioritization 516, and images 518. The images 518 include images of the VR operating environment 114 captured by the monitoring stations 102 and transferred to the image processing device 106 via the transceiver 502. The object detection 508, object identification 512, object location 514, and object prioritization 516 include instructions that are executed by the processor 504 to process the images 518.

The objection detection 508 includes instructions that are executable by the processor 504 to detect objects in the VR operating environment 114. The objection detection 508 may include motion detection 510. The motion detection 510 includes instructions that are executable by the processor 504 to detect motion in the VR operating environment 114. The motion detection 510 may detect motion by identifying image to image changes in images 518, by identifying a difference between a reference image and a given one of the images 518, or by other motion detection processing. In some implementations, the object detection 508 may ignore motion detected within the area 116 corresponding to a user of the VR headset 108. The object detection 508 may identify points associated with a detected object using edge detection. The presence of a detected object may be communicated to the VR headset 108 by the image processing device 106.

The object location 514 includes instructions that are executable by the processor 504 to determine the three dimensional location of an object detected by the objection detection 508. For example, if the object detection 508 identifies an object in images 518 captured by different monitoring stations 102, then the object location 514 can determine the location of the object in the three dimensional VR operating environment 114 by triangulation based on the known locations of the monitoring stations 102 and the known angles between the optical centerlines of the image sensors 304 of the different monitoring stations 102. The location of the object may be communicated to the VR headset 108 by the image processing device 106.

The object identification 512 includes instructions that are executable by the processor 504 to determine the identity of an object detected by the objection detection 508. For example, the object identification 512 may include a Viola-Jones Framework trained to identify a variety of objects that may be present in the VR operating environment 114, such as people and pets. The pixels corresponding to the detected object may be processed by the Viola-Jones Framework to identify the object. The identity of the object may be communicated to the VR headset 108 by the image processing device 106.

The object prioritization 516 includes instructions that are executable by the processor 504 to prioritize the object-related information provided to the VR headset 108 by the image processing device 106. Prioritization may be based on object size, distance between the object and the VR headset 108, object elevation, and/or other factors indicative of collision between the detected object and a user of the VR headset 108. In some implementations, the object prioritization 516 may prioritize a plurality of detected objects according to a risk of collision between the object and the user of the VR headset 108 and communicate information concerning the objects to the VR headset 108 in order of highest determined collision risk.

The storage 506 may include additional logic that has been omitted from FIG. 5 in the interest of clarity. For example, the storage 506 may include VR headset communication that includes instructions that are executable by the processor 504 to transfer information concerning a detected object (e.g., object presence, location, and/or identity) to the VR headset 108. In some implementations, the image processing device 106 may produce the video frames displayed by the VR headset 108. In such implementations, the image processing device 106 may include video rendering instructions that are executable by the processor 504 to generate the video frames displayed by the VR headset 108, and may include in the video frames information concerning a detected object.

Figure 6:
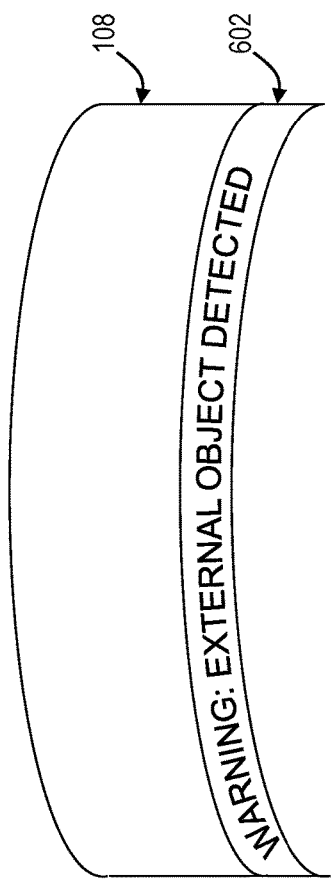
FIGS. 6-8 show displays of object detection information in a VR headset in accordance with various examples.
Figure 7:
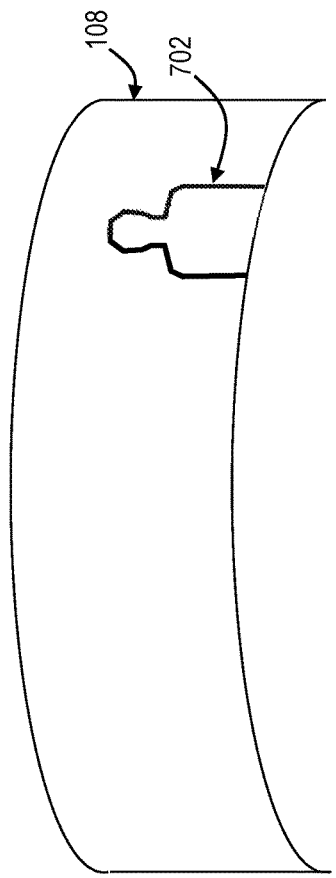
Figure 8:
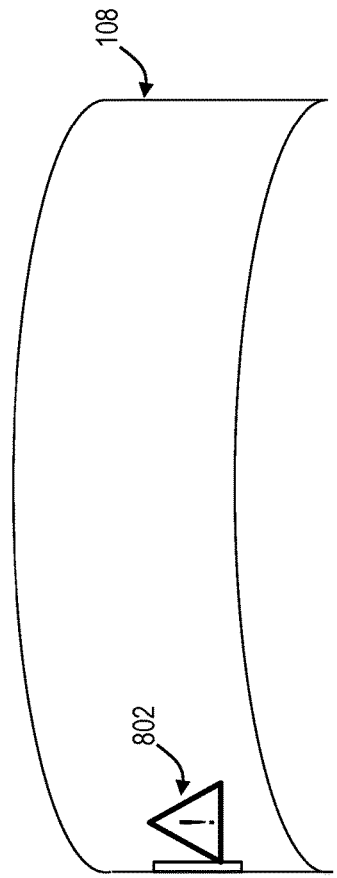

FIGS. 6-8 show display of object detection information in the VR headset 108 in accordance with various examples. The displays of FIGS. 6-8 may be stereoscopic in practice, but are shown as monoscopic in FIGS. 6-8 to promote clarity. In FIG. 6, the VR headset 108 displays an object detection warning as a text field 602. The text field 602 may specify the location and identity of the object in addition to the presence of the object.

In FIG. 7, the VR headset 108 displays an object detection warning as an outline 702 or silhouette of a detected object. The outline 702 of the object may correspond to the identity of the object determined by the object identification 512, and the location of the object in the display of the VR headset 108 may correspond to the location of the object determined by the object location 514.

In FIG. 8, the VR headset 108 displays a warning symbol 802 indicating that an object has been detected and is to the left of the viewing field of the VR headset 108. Some implementations may combine the object information displays of FIGS. 6-8. For example, an object outside of the viewing area of the VR headset 108 may be indicated as per FIG. 8, and as the VR headset 108 is turned towards the object an outline 702 or silhouette of the object may be displayed as per FIG. 7. Similarly, text display 602 may be combined with either the warning symbol 802 or the object outline 702 to provide additional information to the user of the VR headset 108.

Figure 9:
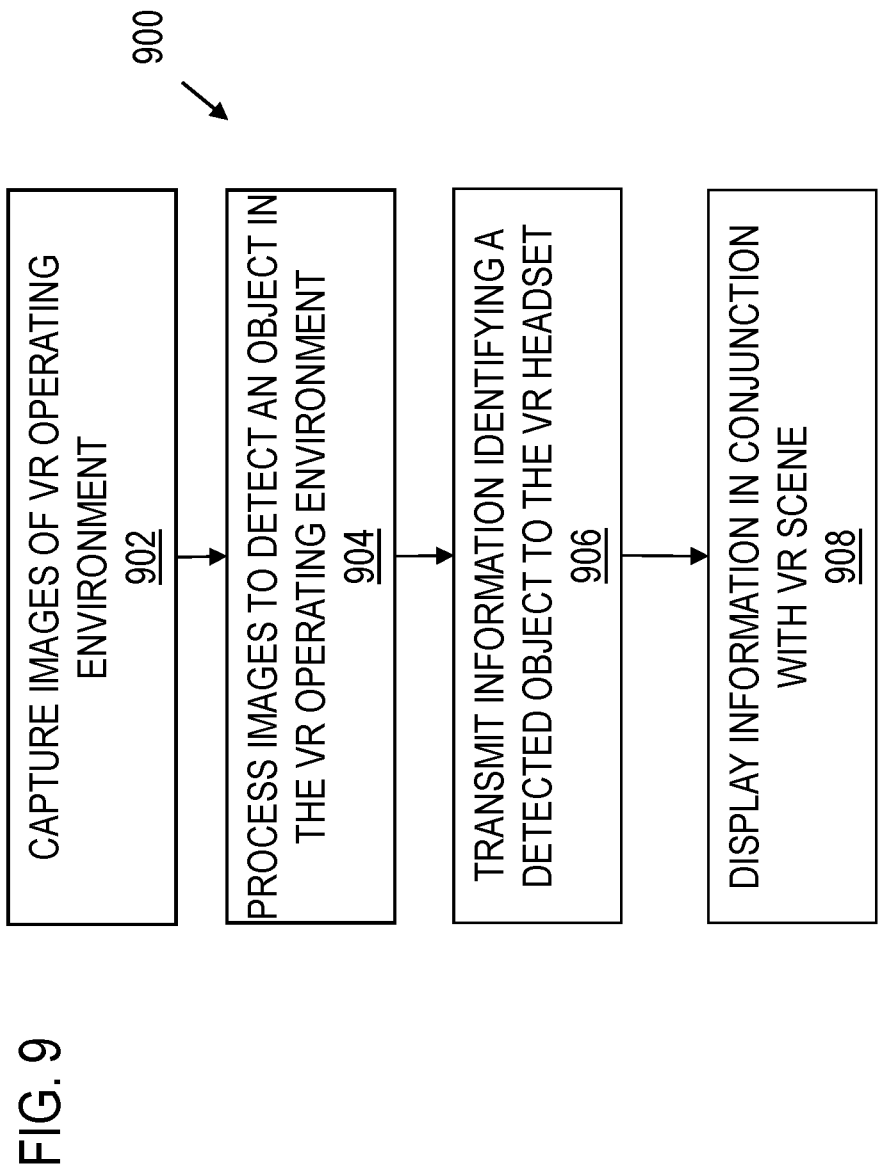
FIG. 9 shows a flow diagram for a method for object detection in a VR system in accordance with various examples.

FIG. 9 shows a flow diagram for a method 900 for object detection in a VR system in accordance with various examples. Though depicted sequentially as a matter of convenience, at least some of the actions shown can be performed in a different order and/or performed in parallel. Additionally, some implementations may perform only some of the actions shown. In some implementations, at least some of the operations of the method 900 can be implemented as instructions stored in a storage device and executed by one or more processors.

In block 902, the monitoring stations 102 capture images of the VR operating environment 114. The monitoring stations 102 are disposed at different locations along the perimeter of the VR operating environment 114. The locations of the monitoring stations 102 and the angles of intersection of the optical centerlines of the image sensors 104 of the monitoring stations 102 may be known to the image processing device 106. The images captured by the monitoring stations 102 may include color information (chroma) and brightness information (luma), or may include only luma. The monitoring stations may capture images as a video stream. For example, the monitoring station 102 may capture images at a rate of 10, 20, 30, etc. images per second. The monitoring stations 102 transfer the captured images to the image processing device 106 for use in object detection.

In block 904, the image processing device 106 processes the images captured by the monitoring stations 102 to detect objects in the VR operating environment 114. The processing may include application of motion detection to identify an object in the VR operating environment 114. For example, the image processing device 106 may detect motion by comparing two images and identifying differences between the two images. The two images may be images captured by the same monitoring station 102 (e.g., monitoring station 102-1) at different times. One of the images may be a reference image. Further, as explained with regard to FIG. 2, the image processing device 106 may identify the VR headset 108 and/or a VR controller 112 in the images and ignore differences in the images (i.e., ignore motion) in a predetermined area 116 about the VR headset 108 and/or a VR controller 112 as attributable to movement of a user of the VR headset 108.

In block 906, the image processing device 106 has detected an object in the VR operating environment 114 and transmits information concerning the detected object to the VR headset 108. The information may include a notification of the objects presence in the VR operating environment 114. The information may be embedded in a video stream provided by the image processing device 106 for display by the VR headset 108, or provided separately from any video information transferred to the VR headset 108. The information may be transferred via a wired or wireless communication channel provided between the image processing device 106 and the VR headset 108. The communication channel may include a wired or wireless network in accordance with various networking standards.

In block 908, the VR headset 108 displays the information received from the image processing device 106 concerning the detected object. The information may be displayed in conjunction with a VR scene displayed by the VR headset 108.

Figure 10:
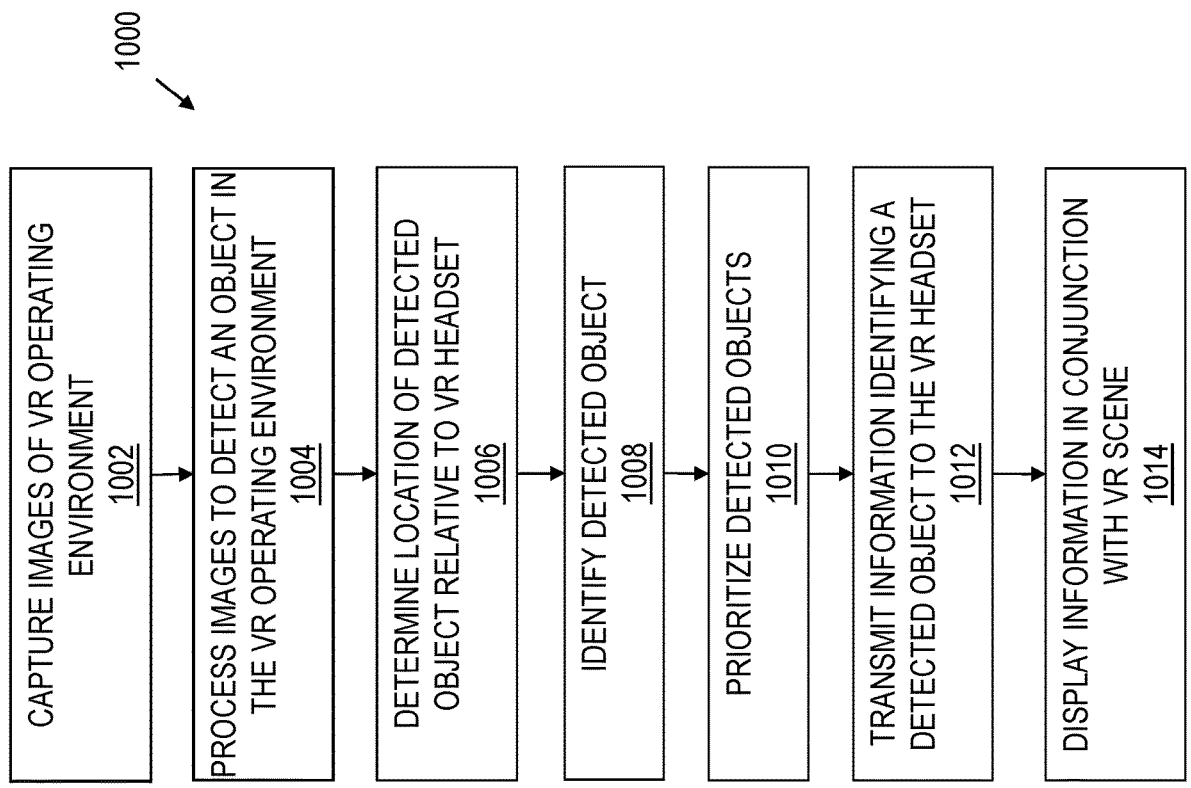
FIG. 10 shows a flow diagram for another implementation of a method for object detection in a VR system in accordance with various examples.

FIG. 10 shows a flow diagram for a method 1000 for object detection in a VR system in accordance with various examples. Though depicted sequentially as a matter of convenience, at least some of the actions shown can be performed in a different order and/or performed in parallel. Additionally, some implementations may perform only some of the actions shown. In some implementations, at least some of the operations of the method 1000 can be implemented as instructions stored in a storage device and executed by one or more processors.

In block 1002, the monitoring stations 102 capture images of the VR operating environment 114. The monitoring stations 102 are disposed at different locations at the perimeter of the VR operating environment 114. The locations of the monitoring stations 102 and the angles of intersection of the optical centerlines of the image sensors 104 of the monitoring stations 102 may be known to the image processing device 106. The images captured by the monitoring stations 102 may include color information (chroma) and brightness information (luma), or may include only luma. The monitoring stations may capture images as a video stream. For example, the monitoring station 102 may capture images at a rate of 10, 20, 30, etc. images per second. The monitoring stations 102 transfer the captured images to the image processing device 106 for use in object detection.

In block 1004, the image processing device 106 processes the images captured by the monitoring stations 102 to detect objects in the VR operating environment 114. The processing may include application of motion detection to identify an object in the VR operating environment 114. For example, the image processing device 106 may detect motion by comparing two images and identifying differences between the two images. The two images may be images captured by the same monitoring station 102 at different times. One of the images may be a reference image. The image processing device 106 may identify the VR headset 108 and/or a VR controller 112 in the images and ignore differences in the images (i.e., ignore motion) in a predetermined area 116 about the VR headset 108 and/or a VR controller 112 as attributable to movement of a user of the VR headset 108.

In block 1006, the image processing device 106 processes the images captured by the monitoring stations 102 to determine the location of any detect objects in the VR operating environment 114. The location determination processing may include identifying the detected object in time coincident images captured by different monitoring stations 102, and applying triangulation to points of the detected object locate the object in three dimensions.

In block 1008, the image processing device 106 processes the images captured by the monitoring stations 102 to determine the identity of any objects detected in the VR operating environment 114. The identify determination processing may include extracting and/or isolating an image of a detected object from an image captured by a monitoring station 102, and providing the image of the detected object to a Viola-Jones Framework. The Viola-Jones Framework may extract features from the image and apply one or more classifiers to identify the object. Various other object identification algorithms may be used in some implementations of the identity determination processing.

In block 1010, the image processing device 106 prioritizes detected objects for presentation to the VR headset 108. Prioritization may be based on object size, distance between the object and the VR headset 108, object elevation, rate of movement towards the user, and/or other factors indicative of collision between the detected object and a user of the VR headset 108. Some implementations of the object prioritization processing may prioritize a plurality of detected objects according to a risk of collision between the object and the user of the VR headset 108 and communicate information concerning the objects to the VR headset 108 in order of highest determined collision risk.

In block 1012, the image processing device 106 has detected an object in the VR operating environment 114 and transmits information concerning the detected object to the VR headset 108. The information may include one or more notifications of the objects present in the VR operating environment 114, location of the detected objects in the VR operating environment 114, and identity of the detected objects. The information may be embedded in a video stream provided by the image processing device 106 for display by the VR headset 108, or provided separately from any video information transferred to the VR headset 108. The information may be transferred via a wired or wireless communication channel provided between the image processing device 106 and the VR headset 108. The communication channel may include a wired or wireless network in accordance with various networking standards.

In block 1014, the VR headset 108 displays the information received from the image processing device 106 concerning the detected object to allow a user of the VR headset 108 to become aware of the detected object, and potentially avoid a collision with the detected object. The information may be displayed in conjunction with a VR scene displayed by the VR headset 108.

The above discussion is meant to be illustrative of the principles and various examples of the present invention. Numerous variations and modifications will become apparent to those skilled in the art once the above disclosure is fully appreciated. It is intended that the following claims be interpreted to embrace all such variations and modifications.

What is claimed is:

1. A virtual reality (VR) system, comprising:
   a VR headset having a first location;
   a first image sensor having a second location and disposed to capture a first view of an environment from a first angle and a second image sensor having a third location and disposed to capture a second view of the environment from a second angle; and
   a processor to:
      receive, via a transceiver, a first image of the first view from the first image sensor and a second image of the second view from the second image sensor;
      determine the first image and the second image include an object;
      determine a fourth location of the object based on the first location, the second location, the third location, the first angle, and the second angle; and
      transmit, via the transceiver, information comprising notification of the object having the fourth location to the VR headset.

2. The system of claim 1, wherein, to determine the first image and the second image include the object, the processor is to disregard objects within an area corresponding to a user.

3. The system of claim 2, comprising a VR controller, wherein the processor is to determine the area is extending from above the VR headset to a floor of the environment and to an extension of the VR controller about a central axis corresponding to the user.

4. The system of claim 2, wherein the processor is to determine the area by mapping a body and limbs of the user.

5. The system of claim 1, wherein the processor is to determine an identity of the object based on the first image and the second image, and wherein the notification includes the identity of the object.

6. The system of claim 1, wherein the processor is to prioritize transmission of the information associated with multiple objects based on locations of the multiple objects relative to the VR headset.

7. The system of claim 1, wherein the VR headset is to display the information in conjunction with a VR scene.

8. A method, comprising:
receiving, by a processor via a transceiver, a first image of a first view from a first image sensor and a second image of a second view from a second image sensor, the first image sensor having a first location and disposed to capture a first view of an environment from a first angle and a second image sensor having a second location and disposed to capture a second view of the environment from a second angle;
determining, by the processor, the first image and the second image include an object;
determining, by the processor, an object location of the object based on the first location, the second location, a headset location of a virtual reality (VR) headset, the first angle, and the second angle; and
transmitting, by the processor via the transceiver, information comprising notification of the object having the object location to the VR headset.

9. The method of claim 8, wherein determining the first image and the second image include the object comprises disregarding objects within an area corresponding to a user.

10. The method of claim 9, comprising determining that the area is extending from above the VR headset to a floor of the environment and to an extension of the VR controller about a central axis corresponding to the user.

11. The method of claim 9, comprising determining the area by mapping a body and limbs of the user.

12. The method of claim 8, comprising determining an identity of the object based on the first image and the second image, and wherein the notification includes the identity of the object.

13. The method of claim 8, comprising prioritizing transmission of the information associated with multiple objects based on locations of the multiple objects relative to the VR headset.

14. The method of claim 8, comprising displaying, by the VR headset, the information in conjunction with a VR scene.

15. The method of claim 8, wherein determining that the first image and the second image include the object comprises:
comparing a first set of images captured at a first given time, the first set of images including the first image and the second image, and a second set of images captured by the first image sensor and the second image sensor at a second given time, to detect motion of the object.

16. A non-transitory computer-readable medium encoded with instructions to cause a processor to:
receive, via a transceiver, a first image of a first view from a first image sensor and a second image of a second view from a second image sensor, the first image sensor having a first location and disposed to capture a first view of an environment from a first angle and a second image sensor having a second location and disposed to capture a second view of the environment from a second angle;
determine the first image and the second image include an object;
determine an object location of the object based on the first location, the second location, a headset location of a virtual reality (VR) headset, the first angle, and the second angle; and
transmit, via the transceiver, information comprising notification of the object having the object location to the VR headset.

17. The computer-readable medium of claim 16, wherein, to determine the first image and the second image include the object, the instructions cause the processor to disregard objects within an area corresponding to a user.

18. The computer-readable medium of claim 17, comprising a VR controller, wherein the instructions cause the processor to determine the area is extending from above the VR headset to a floor of the environment and to an extension of the VR controller about a central axis corresponding to the user.

19. The computer-readable medium of claim 17, wherein the instructions cause the processor to determine the area by mapping a body and limbs of the user.

20. The computer-readable medium of claim 16, wherein the instructions cause the processor to determine an identity of the object based on the first image and the second image, and wherein the notification includes the identity of the object.

* * * * *